(12) United States Patent
McCallum

(10) Patent No.: US 12,125,472 B2
(45) Date of Patent: Oct. 22, 2024

(54) METHODS AND APPARATUS TO SEGMENT AUDIO AND DETERMINE AUDIO SEGMENT SIMILARITIES

(71) Applicant: Gracenote, Inc., Emeryville, CA (US)

(72) Inventor: Matthew McCallum, San Francisco, CA (US)

(73) Assignee: Gracenote, Inc., New York, NY (US)

( * ) Notice: Subject to any disclaimer, the term of this patent is extended or adjusted under 35 U.S.C. 154(b) by 92 days.

(21) Appl. No.: 18/298,044

(22) Filed: Apr. 10, 2023

(65) Prior Publication Data

US 2023/0245645 A1 Aug. 3, 2023

Related U.S. Application Data

(63) Continuation of application No. 17/331,596, filed on May 26, 2021, now Pat. No. 11,657,798, which is a
(Continued)

(51) Int. Cl.
 *G10L 15/16* (2006.01)
 *G10L 15/04* (2013.01)
 *G10L 15/06* (2013.01)

(52) U.S. Cl.
 CPC ............ *G10L 15/04* (2013.01); *G10L 15/063* (2013.01); *G10L 15/16* (2013.01)

(58) Field of Classification Search
 CPC ......... G10L 15/16; G10L 19/02; G10L 21/06; G10L 25/03; G06N 3/02; G06N 20/10; G10H 2210/061; G10H 2210/076
 (Continued)

(56) References Cited

U.S. PATENT DOCUMENTS

| 9,514,722 B1 | 12/2016 | Kim et al. |
| 11,024,288 B2 | 6/2021 | McCallum |

(Continued)

FOREIGN PATENT DOCUMENTS

| WO | 2007/029002 | 3/2007 |
| WO | 2009/001202 | 12/2008 |
| WO | 2010/043258 | 4/2010 |

OTHER PUBLICATIONS

McCallum, Matthew, "Unsupervised Learning of Deep Features for Music Segmentation", Proceedings of the 44th International Conference on Acoustics, Speech, and Signal Processing (ICASSP), 2019, 5 Pages. (Year: 2019).*

(Continued)

*Primary Examiner* — Martin Lerner
(74) *Attorney, Agent, or Firm* — McDonnell Boehnen Hulbert & Berghoff LLP

(57) ABSTRACT

Methods, apparatus, and systems are disclosed to segment audio and determine audio segment similarities. An example apparatus includes at least one memory storing instructions and processor circuitry to execute instructions to at least select an anchor index beat of digital audio, identify a first segment of the digital audio based on the anchor index beat to analyze, the first segment having at least two beats and a respective center beat, concatenate time-frequency data of the at least two beats and the respective center beat to form a matrix of the first segment, generate a first deep feature based on the first segment, the first deep feature indicative of a descriptor of the digital audio, and train internal coefficients to classify the first deep feature as similar to a second deep feature based on the descriptor of the first deep feature and a descriptor of a second deep feature.

20 Claims, 10 Drawing Sheets

Related U.S. Application Data continuation of application No. 16/121,034, filed on Sep. 4, 2018, now Pat. No. 11,024,288.

(58) Field of Classification Search
USPC ....... 704/216, 217, 232, 237, 239, 270, 276; 706/20, 21, 22
See application file for complete search history.

(56) References Cited

U.S. PATENT DOCUMENTS

| | | | | |
|---|---|---|---|---|
| 11,657,798 | B2* | 5/2023 | McCallum | G10L 15/16 704/232 |
| 2003/0040904 | A1 | 2/2003 | Whitman et al. | |
| 2003/0160944 | A1 | 8/2003 | Foote et al. | |
| 2003/0205124 | A1* | 11/2003 | Foote | G10H 1/40 84/608 |
| 2004/0231498 | A1 | 11/2004 | Li et al. | |
| 2005/0247185 | A1 | 11/2005 | Uhle | |
| 2007/0061352 | A1 | 3/2007 | Dimitrova et al. | |
| 2007/0291958 | A1 | 12/2007 | Jehan | |
| 2008/0300702 | A1 | 12/2008 | Gomez et al. | |
| 2009/0265024 | A1 | 10/2009 | Dittmar et al. | |
| 2010/0126332 | A1* | 5/2010 | Kobayashi | G10H 1/383 84/613 |
| 2011/0271819 | A1 | 11/2011 | Arimoto et al. | |
| 2014/0366710 | A1 | 12/2014 | Eronen et al. | |
| 2015/0039541 | A1* | 2/2015 | Kapur | G06N 20/00 706/12 |
| 2016/0012807 | A1 | 1/2016 | Neuhauser et al. | |
| 2016/0027418 | A1 | 1/2016 | Neuhauser et al. | |
| 2017/0024615 | A1 | 1/2017 | Allen et al. | |
| 2017/0207762 | A1 | 7/2017 | Porter et al. | |
| 2017/0249534 | A1 | 8/2017 | Townsend et al. | |
| 2017/0371961 | A1 | 12/2017 | Douglas | |
| 2018/0025732 | A1 | 1/2018 | Lepauloux et al. | |
| 2018/0039859 | A1 | 2/2018 | Harwath et al. | |
| 2018/0276540 | A1 | 9/2018 | Xing | |
| 2020/0074982 | A1 | 3/2020 | McCallum | |
| 2020/0152162 | A1 | 5/2020 | Maezawa | |

OTHER PUBLICATIONS

Marolt, "A Mid-level Melody-based Representation for Calculating Audio Similarity," University of Victoria, 2006, 6 pages.
Badaway et al., "Audio Novelty-Based Segmentation of Music Concerts," Acoustics 2013 New Delhi, Nov. 10-15, 2013, 6 pages.
Foote et al., "Media Segmentation using Self-Similarity Decomposition," IEEE International Conference on Multimedia and Expo, Jul. 6, 2005, 9 pages.
Grill et al., "Music Boundary Detection Using Neural Networks on Spectrograms and Self-Similarity Lag Matrices," Austrian Research Institute for Artificial Intelligence (OFAI), European Signal Processing Conference (EUSIPCO), 2015, 5 pages.
Cohen-Hadria et al., "Music Structure Boundaries Estimation Using Multiple Self-Similarity Matrices as Input Depth of Convolutional Neural Networks," AES International Conference Semantic Audio 2017, Jun. 2017, Erlangen, Germany, <http://www.aes.org/conferences/2017/semantic/>, 9 pages.
Jansen et al., "Unsupervised Learning of Semantic Audio Representations," ML4Audio 2017 workshop, 5 pages.
Nieto et al., "Music Segment Similarity Using 2D-Fourier Magnitude Coefficients," 2014 IEEE International Conference on Acoustic, Speech and Signal Processing (ICASSP), 5 pages.
Jonathan Foote, "Automatic Audio Segmentation Using a Measure of Audio Novelty," Proceedings of 2000 IEEE International Conference on Multimedia and Expo_(ICME2000), Jul. 30-Aug. 2, 2000, 4 pages.
Nieto et al., "Systematic Exploration of Computational Music Structure Research," 17th International Society for Music Information Retrieval Conference, 2016, 7 pages.
Mcfee et al., "Analyzing Song Structure with Spectral Clustering," 15th International Society for Music Information Retrieval Conference, 2014, 6 pages.
Mcfee et al., "Libroso: Audio and Music Signal Analysis in Python," The Proceedings of the 14th Python in Science Conference 2015 (SCIPY 2015), 18 pages.
Daniel P.W. Ellis, "Beat Tracking by Dynamic Programming," Journal of New Music Research 36(1): 51-60, Mar. 2007, 11 pages.
Klapuri et al., "Analysis of Meter of Acoustic Musical Signals," IEEE Transactions Speech and Audio Processing 2004, 15 pages.
United States Patent and Trademark Office, "Final Office Action," issued in connection with U.S. Appl. No. 16/121,034, issued on Jul. 27, 2020, 19 pages.
United States Patent and Trademark Office, "Non Final Office Action," issued in connection with U.S. Appl. No. 16/121,034, issued on Apr. 10, 2020, 16 pages.
United States Patent and Trademark Office, "Notice of Allowance and Fee(s) Due," issued in connection with U.S. Appl. No. 16/121,034, issued on Jan. 29, 2021, 8 pages.
United States Patent and Trademark Office, "Supplemental Notice of Allowability," issued in connection with U.S. Appl. No. 16/121,034, issued on Apr. 28, 2021, 2 pages.
Wikipedia, "Crest Factor," Oct. 30, 2020, 7 pages.
Jansen et al.,"Unsupervised Learning of Semantic Audio Representations," 2018 IEEE International Conference on Acoustics Speech and Signal Processing (ICASSP), Apr. 15-20, 2018, 5 pages. (Year: 2018).
McCallum, "Unsupervised Learning of Deep Features for Music Segmentation", 2019 IEEE International Conference on Acoustics, Speech and Signal Processing, ICASSP 2019, May 1, 2019, pp. 346 to 350. (Year: 2019).
Serra et al., Unsupervised Music Structure Annotation by Time Series Structure Features and Segment Similarity, IEEE Transactions on Multimedia 16(5): pp. 1229-1240, Aug. 2014. (Year: 2014).

* cited by examiner

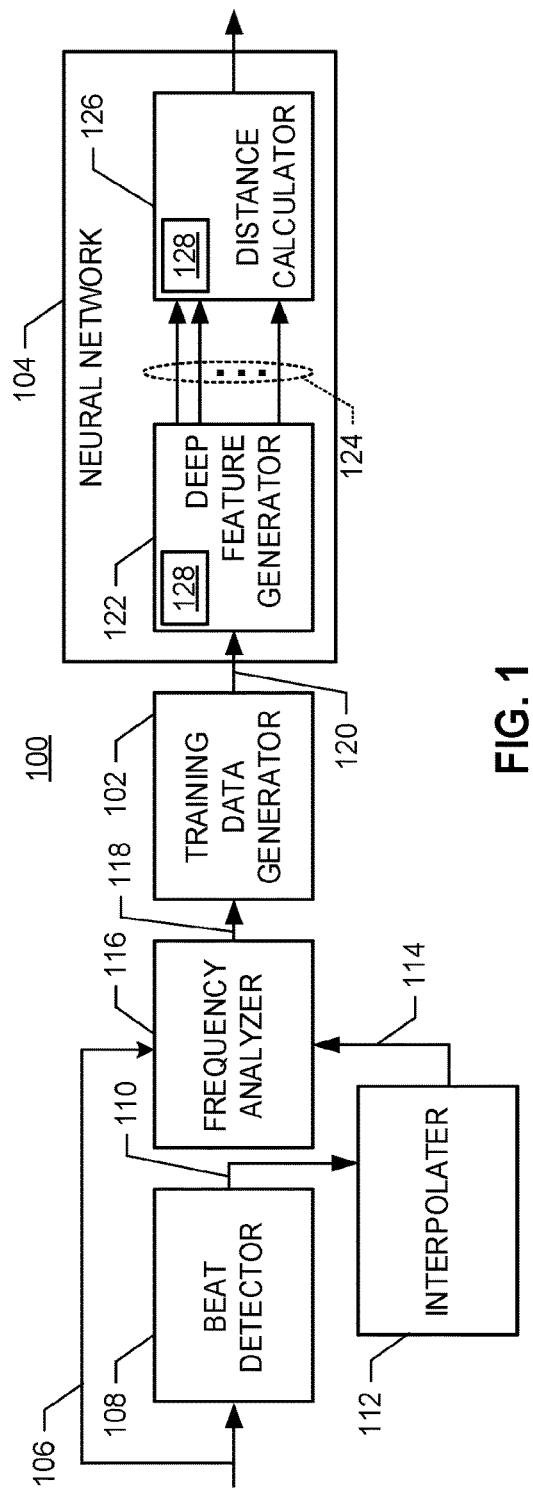
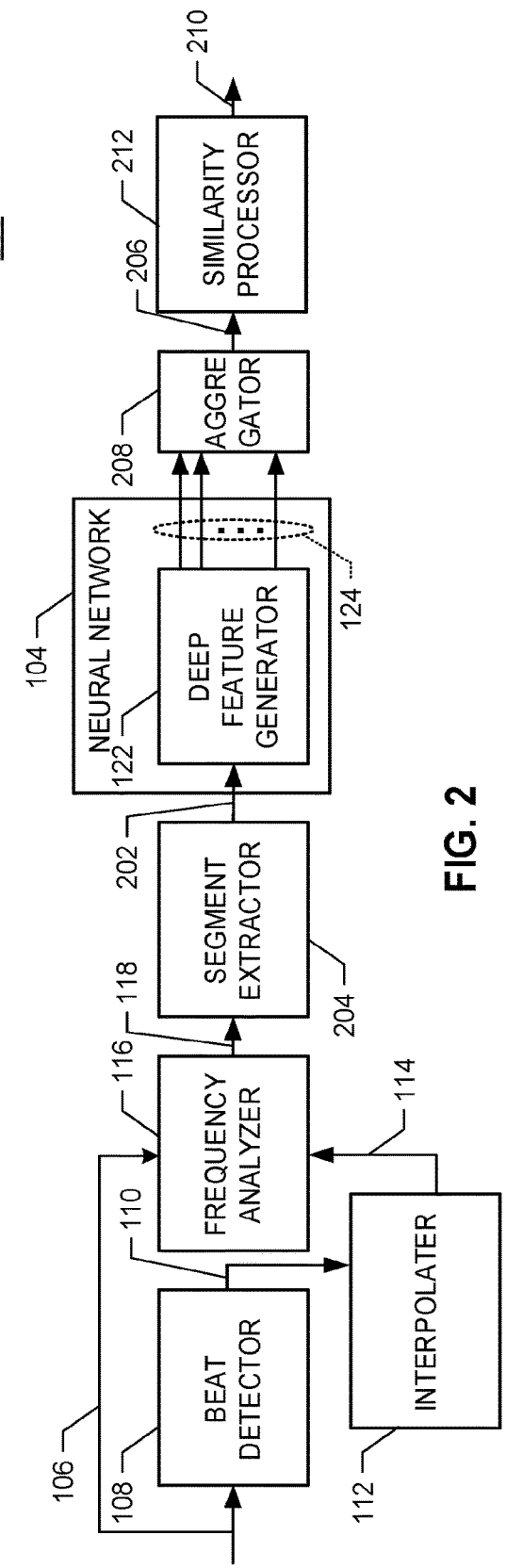
FIG. 1
FIG. 2

METHODS AND APPARATUS TO SEGMENT AUDIO AND DETERMINE AUDIO SEGMENT SIMILARITIES

RELATED APPLICATION

This patent arises from a continuation of U.S. patent application Ser. No. 17/331,596, filed on May 26, 2021, which is a continuation of U.S. patent application Ser. No. 16/121,034, (Now U.S. Pat. No. 11,024,288) filed on Sep. 4, 2018; each of which is hereby incorporated by reference in its entirety.

FIELD OF THE DISCLOSURE

This disclosure relates generally to audio segmentation, and, more particularly, to methods and apparatus to segment audio and determine audio segment similarities.

BACKGROUND

Audio segmentation refers to the labelling of boundaries and segments in audio. Segmentation of music, in particular, provides an informative timeline (e.g., one that labels sections, boundaries, salient points, etc. of music), thus providing a number of benefits. For example, music editors, music producers, disk jockeys, consumers, advertisers, etc. browse music to identify similar and/or dissimilar audio segments. They may also want to make music segment selections based on mood, style and/or recommendations that depend on audio data and metadata for use in developing and/or training algorithms for music identification and/or classification. They may further desire to visually represent music segmentation on a timeline to provide an enhanced listening experience to a listener and/or audience.

BRIEF DESCRIPTION OF THE DRAWINGS

FIG. 1 illustrates an example training data generator constructed in accordance with teachings of this disclosure and shown in an example environment of use.

FIG. 2 illustrates an example similarity processor constructed in accordance with teachings of this disclosure and shown in an example environment of use.

Figure 3:
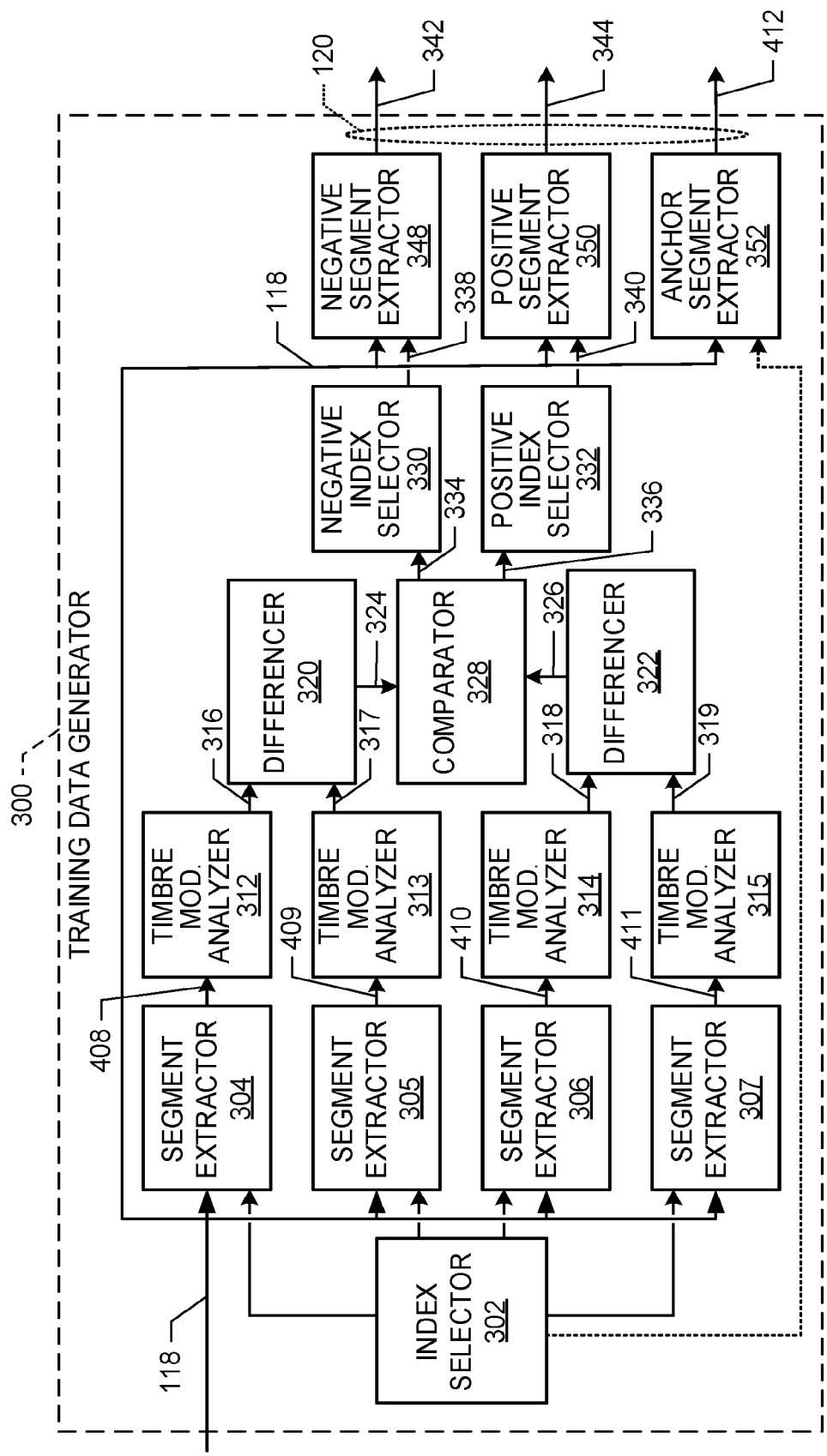
FIG. 3 is a block diagram illustrating an example implementation of the example training data generator of FIG. 1.

In general, the same reference numbers will be used throughout the drawing(s) and accompanying written description to refer to the same or like parts. Connecting lines or connectors shown in the various figures presented are intended to represent example functional relationships, physical couplings and/or logical couplings between the various elements.

DETAILED DESCRIPTION

Reference will now be made in detail to non-limiting examples, some of which are illustrated in the accompanying drawings.

FIG. 1 illustrates an example training system 100 including an example training data generator 102 constructed in accordance with teachings of this disclosure to generate training data for training an example neural network 104 to characterize audio segments.

To detect beats in incoming digital audio 106, the example training system 100 includes an example beat detector 108. The example beat detector 108 of FIG. 1 generates an example stream of beat markers 110 representing the detected beats (e.g., a stream, list, etc. of timestamps for the detected beats). In music, the beat is the basic unit of time or pulse of the music. The beat is, for example, the rhythm listeners would tap their toes to when listening to a piece of music, what a musician counts while performing, etc. Any number and/or type(s) of method(s), algorithm(s), circuit(s), etc. may be used to detect beats in the incoming digital audio 106. For example, an example approach includes the probabilistic tracking of regularly occurring peaks in a spectral flux signal. An example of which is described in a paper by Daniel P. W. Ellis entitled "Beat Tracking by Dynamic Programming" and published in Journal of New Music Research 36(1): 51-60, March 2007, the entirety of which is incorporated herein by reference. An example implementation of these concepts can be found in a widely available open source python package named librosa. A description of librosa can be found in a paper by McFee et al. entitled "librosa: Audio and Music Signal Analysis in Python" and published in The Proceedings of the 14$^{th}$ Python in Science Conference 2015 (SCIPY 2015), the entirety of which is incorporated herein by reference. In some examples, comb filtering and/or beats per minute (BPM) estimation prior to the application of a probabilistic tracking (via a hidden Markov model) are used to improve beat tracking performance. Example comb filtering and BPM estimation means are described in a paper by Klapuri et al. entitled "Analysis of the Meter of Acoustic Musical Signals" and published in IEEE Transactions Speech and Audio Processing 2004, the entirety of which is incorporated herein by reference. The incoming digital audio 106 includes a stream of spaced apart time-domain digital samples. In some examples, the incoming digital audio 106 is formed by sampling an analog signal, formed in the digital domain, etc.

To interpolate the detected beats 110, the example training system 100 of FIG. 1 includes an example interpolator 112. The example interpolator 112 of FIG. 1 interpolates the beat markers 110 to form time points (e.g., one hundred twenty-eight time points per beat, considering a beat as a time point). That is, a predetermined number of time points (e.g., one hundred twenty-seven time points) are created that are evenly spaced between two adjacent beats of the music. For example, two hundred fifty-six time points per second at one hundred twenty beats per minute. For instance, for an example pair of successive beat markers at 1.0 seconds and 2.28 seconds, the corresponding time points include a first time point at one second with one hundred twenty-seven time points spaced apart by 0.01 seconds thereafter (excluding a time point at 2.28 seconds). Other numbers of interpolated time points between beats may be used. In some examples, linear time interpolation is used to form the interpolated time points 114. Other interpolations may be used.

Figure 9:
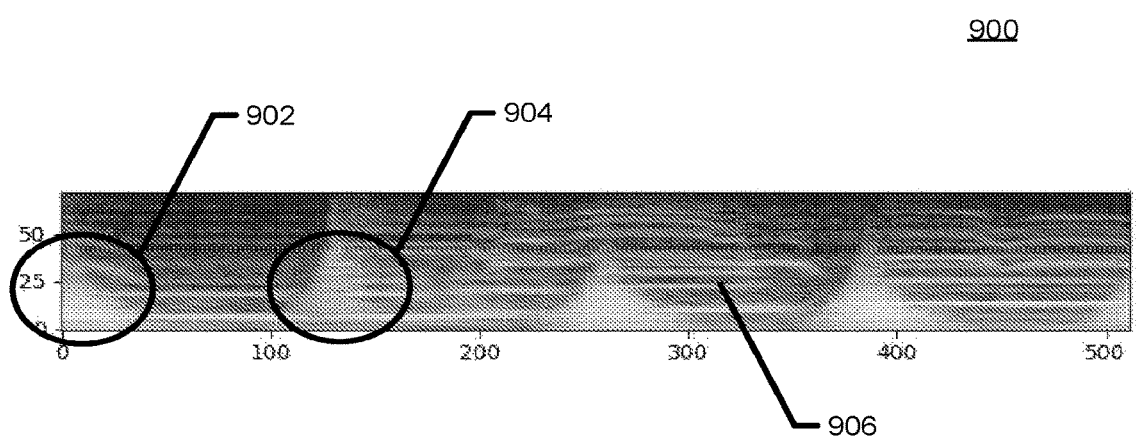
FIG. 9 is a plot of example time-frequency data.

To analyze the incoming digital audio 106, the example training system 100 includes an example frequency analyzer 116. The example frequency analyzer 116 of FIG. 1 performs a log-frequency analysis of the incoming digital audio 106 associated with a beat to form example time-frequency data 118. The example time-frequency data 118 of FIG. 1 is a matrix having columns that store frequency-domain data for a particular time point. The frequency-domain data is computed over a portion of the incoming digital audio 106 associated with a time point or beat. For example, over a block of samples of the incoming digital audio 106 centered on, to one side of, etc. the time point. Columns of the matrix are real-valued magnitude frequency-domain samples (e.g., seventy-two samples spanning six frequency octaves at twelve samples per octave) to form a one hundred twenty-eight (time points) by seventy-two (frequencies) matrix of values. In some examples, the frequency analyzer 116 computes the columns of the time-frequency data 118 using a constant-Q transform (CQT), however, other transforms may be used (e.g., a Mel spectrogram, Mel frequency cepstrum coefficients (MFCC), bark bands, etc.). A CQT is typically computed by extracting a windowed segment of the incoming digital audio 106 centered on one of the time points, and computing a discrete Fourier transform on this segment. The complex-valued output of this Fourier transform is then multiplied by a matrix where each row consists of the Fourier transform of a time window of constant-Q modulated by each of a set of logarithmically spaced frequency sinusoids. The output of this matrix multiplication is then a complex valued vector, of which, the magnitude or log magnitude may be taken as an indication of the energy at the set of logarithmically spaced frequencies. An example output 900 of the final log magnitude operation for a four beat segment of audio is shown in FIG. 9, where a pulse of high energy (e.g., areas 902 and 904) is present at each beat. It can be seen that the example output 900 of FIG. 9 is aligned to start and end at the center of a beat with three beats in between. Amongst the beat events are harmonics represented as horizontal lines (e.g., a line 906) in the log magnitude representation shown in FIG. 9, which likely correspond to chords and/or a melody. In the illustrated example, a log-frequency spaced analysis is used so, if the pitch of a note changes (e.g., with a note, chord, or key change), the spacing in the frequency-domain between its harmonics remains the same. Because the samples of the time points at which a transform is computed are beat aligned, the time-frequency data 118 for the transform is also beat aligned.

To generate training data 120 for the neural network 104, the example training system 100 of FIG. 1 includes the example training data generator 102. The example training data generator 102 of FIG. 1 generates training data 120 that includes anchor data, similar data that is musically similar to the anchor data, and dissimilar data that is musically dissimilar from the anchor data. The training data generator 102 provides the training data 120 to the neural network 104. The anchor data, the similar data and the dissimilar data are formed by combining time-frequency data 118 for one or more whole beats of the incoming digital audio 106 to form segments. In some examples, a segment includes a concatenation of two or more matrices of the time-frequency data 118.

Figure 12:
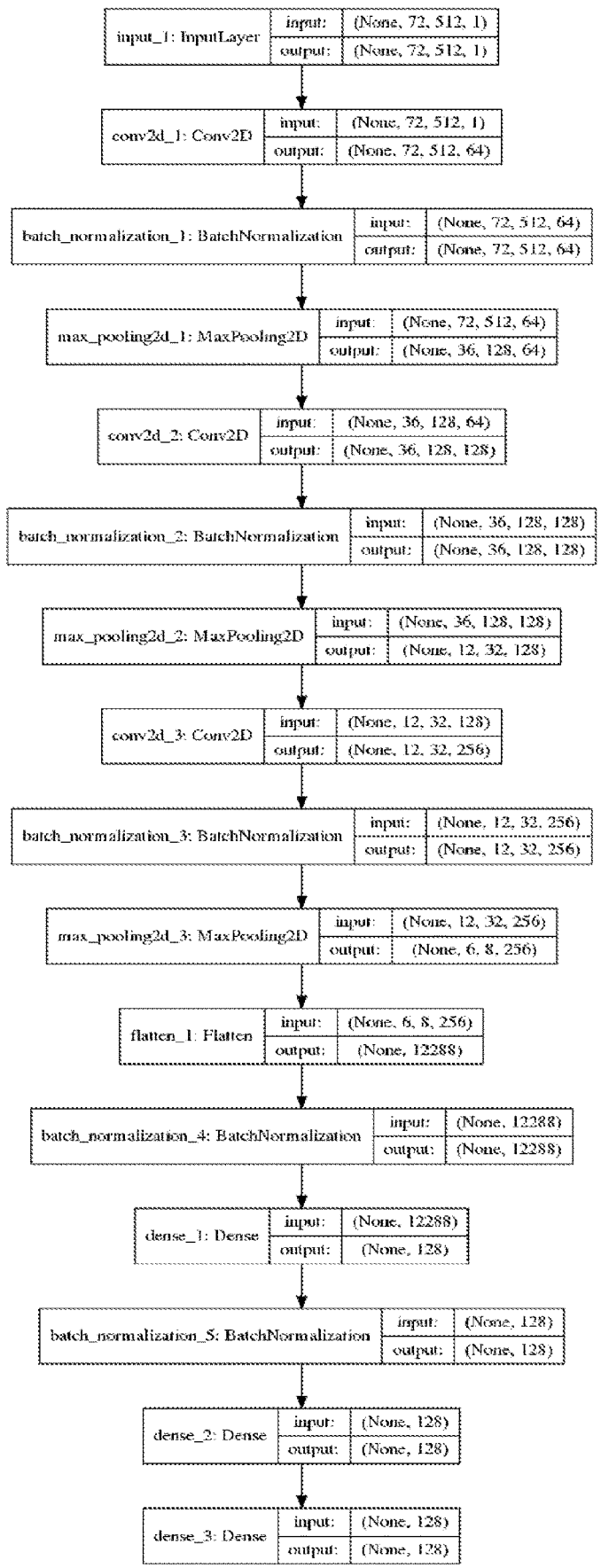
FIG. 12 an example convolutional neural network architecture.

The example neural network 104 of FIG. 1 is any type, configuration, architecture of convolutional neural network (CNN). An example convolutional neural network architecture that can be used to implement the example neural network 104 is shown in FIG. 12. The neural network 104 has an example deep feature generator 122 that generates, develops, forms, computes, etc. so called deep features 124 that can be combined e.g., by a distance calculator 126 of some sort, that generates a distance metric that can be used to embed and/or classify audio, data, objects, information, etc. The deep features 124 computed by the deep feature generator 122 may represent classes and/or descriptors of audio, data, objects, information, etc. For example, the deep feature generator 122 may generate deep features 124 that are representative of pitch, melodies, chords, rhythms, timbre modulation, instruments, production methods and/or effects (e.g., filtering, compression, panning), vocalists, dynamics etc. When deep features 124 for different portions of the incoming digital audio 106 are compared by the distance calculator 126, the distance metric 126 can determine whether the portions are musically similar or musically dissimilar.

The deep feature generator 122 and the distance calculator 126 and/or, more generally, the neural network 104 update, train, adapt, etc. their internal coefficients 128, using a triplet loss or contrastive loss based on the training data 120, which includes anchor data, similar data and dissimilar data. The neural network 104 updates the internal coefficients 128 so the deep features 124 generated from the similar data and the anchor data become closer together (e.g., in Euclidean distance), and deep features 124 generated from the dissimilar data and the anchor data become further apart (e.g., in Euclidean distance). A triplet loss enforces the statement "X is more similar to Y than Z" for a given distance measure. Therefore, incurring high loss when X is far from Y or when X is close to Z. As this loss is decreased throughout a training procedure such as stochastic gradient descent, the output features of X and Y become closer together with respect to the distance measure whilst Z is made further away from X and Y, up to a margin. Contrastive loss is very similar although it enforces "X is similar to Y" and "X is dissimilar to Z" independently on each example, as such it computes distances between pairs of examples that are similar or dissimilar, rather than triplets. An example of triplet loss using Euclidean distance can be expressed mathematically as:

$$\text{Loss}=[\|X-Y\|_2^2-\|X-Z\|_2^2+\alpha]_+, \quad \text{EQN (1)}$$

for a single triple of neural network outputs X, Y and Z. The symbol alpha corresponds to a margin that is enforced between positive and negative examples.

While an example training system 100 is illustrated in FIG. 1, one or more of the elements, processes and/or devices illustrated in FIG. 1 may be combined, divided, re-arranged, omitted, eliminated and/or implemented in any other way. Further, the example training data generator 102, the example neural network 104, the example beat detector 108, the example interpolator 112, the example frequency analyzer 116, the example deep feature generator 122, the example distance calculator 126 and/or, more generally, the example training system 100 of FIG. 1 may be implemented by hardware, software, firmware and/or any combination of hardware, software and/or firmware. Thus, for example, any of the example training data generator 102, the example neural network 104, the example beat detector 108, the example interpolator 112, the example frequency analyzer 116, the example deep feature generator 122, the example distance calculator 126 and/or, more generally, the example training system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example training data generator 102, the example neural network 104, the example beat detector 108, the example interpolator 112, the example frequency analyzer 116, the example deep feature generator 122, the example combiner 126 and/or the example training system 100 is/are hereby expressly defined to include a non-transitory computer-readable storage device or storage disk such as a memory, a digital versatile disk (DVD), a compact disc (CD), a Blu-ray disk, etc. including the software and/or firmware. Further still, the example training system 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIG. 2 illustrates an example similarity analysis system 200 including the example incoming digital audio 106, the example beat detector 108, the example beat markers 110, the example interpolator 112, the example interpolated time points 114, the example frequency analyzer 116, the example time-frequency data 118, the example neural network 104, and the example deep feature generator 122 that were described above in connection with FIG. 1 and will not be repeated here. Instead, the interested reader is referred to the descriptions of the example incoming digital audio 106, the example beat detector 108, the example beat markers 110, the example interpolator 112, the example interpolated time points 114, the example frequency analyzer 116, the example time-frequency data 118, the example neural network 104, and the example deep feature generator 122 provided above in connection with FIG. 1. The deep feature generator 122 of the example similarity analysis system 200 of FIG. 2 may be trained using the example training system 100 of FIG. 1. However, other means to train the deep feature generator 122 may be used.

In an example operation, the example beat detector 108, the example interpolator 112 and the example frequency analyzer 116 of FIGS. 1 and 2 process all of the incoming digital audio 106 (e.g., associated with all of a song), thereby forming a matrix of time-frequency data 118 for each beat.

To form segments 202 for analysis, the example similarity analysis system 200 of FIG. 2 includes an example segment extractor 204. The example segment extractor 204 forms segments 202 by combining time-frequency data 118 for one or more beats to form segments. In some examples, a segment includes a horizontal (e.g., side-by-side) or vertical (e.g., top-to-bottom) concatenation of two or more matrices of the time-frequency data 118. In some examples, the segment extractor 204 generates a plurality of segments 202 that cover substantially all of the incoming digital audio 106. For instance, the segment extractor 204 generates a first segment 202 consisting of beats one to four inclusive, a second segment 202 of beats two to five inclusive, a third segment 202 of beats three to six inclusive, etc.

The example deep feature generator 122 forms a set of deep features 124 for each of the segments 202 formed by the segment extractor 204. Each set of the deep features 124 is placed in a column of a feature matrix 206 by an aggregator 208.

In an example operation, once the example frequency analyzer 116 forms the time-frequency data 118 for each beat, the example segment extractor 204 forms a plurality of segments 202 from the time-frequency data 118 that are associated with a respective one of the beats. Each of the segments 202 is passed into the example neural network 104 to form a set of deep features 124 for the beat associated with the segment 202. The example aggregator 208 forms the feature matrix 206 by placing the set of deep features 124 into a column for the beat associated with the segment 202. Thus, the feature matrix 206 has a column for each beat, and the data in each column represents the set of deep features 124 associated with the beat.

To determine similarity information 210, the example similarity analysis system 200 includes an example similarity processor 212. Based on a set of deep features 124 for each segment 202 (e.g., corresponding to columns of the feature matrix 206) the similarity processor 212 determines similarity and/or dissimilarity of each portion of the incoming digital audio 106 with other portions of the incoming digital audio 106. In some examples, each set of deep features 124 for a segment 202 is 12 normalized. Such information can be used to identify similar and dissimilar portions via a distance metric, such as the Euclidean distance. For example, a deep feature that is close in terms of the distance metric to multiple other long contiguous sections of deep features of a song may be associated with a refrain and likely be readily associated with a song by listeners. For a Euclidean distance, the computation of similarity $S_{i,j}$ between features $x_i$ and $x_j$ can be computed using the following mathematical expression:

$$S_{i,j} = \|x_i - \sqrt{x_j}\|_2^2, \qquad \text{EQN (2)}$$

where i and j index the feature matrix 206. In practice, this is computed for all i and j creating a square matrix where each column may be indexed by column i and row j. An example output matrix can be seen in FIG. 6.

While an example similarity analysis system 200 is illustrated in FIG. 2, one or more of the elements, processes and/or devices illustrated in FIG. 2 may be combined, divided, re-arranged, omitted, eliminated and/or implemented in any other way. Further, the example neural network 104, the example beat detector 108, the example interpolator 112, the example frequency analyzer 116, the example deep feature generator 122, the example segment extractor 204, the aggregator 208, the example similarity processor 212 and/or, more generally, the example similarity analysis system 200 of FIG. 2 may be implemented by hardware, software, firmware and/or any combination of hardware, software and/or firmware. Thus, for example, any of the example neural network 104, the example beat detector 108, the example interpolator 112, the example frequency analyzer 116, the example deep feature generator 122, the example segment extractor 204, the aggregator 208, the example similarity processor 212 and/or, more generally, the example similarity analysis system 200 of FIG. 2 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example neural network 104, the example beat detector 108, the example interpolator 112, the example frequency analyzer 116, the example deep feature generator 122, the example segment extractor 204, the aggregator 208, the example similarity processor 212 and/or the example similarity analysis system 200 is/are hereby expressly defined to include a non-transitory computer-readable storage device or storage disk such as a memory, a DVD, a CD, a Blu-ray disk, etc. including the software and/or firmware. Further still, the example similarity analysis system 200 of FIG. 2 may include one or more elements, processes and/or devices in addition to, or instead of, those illustrated in FIG. 2, and/or may include more than one of any or all of the illustrated elements, processes and devices.

Figure 4:
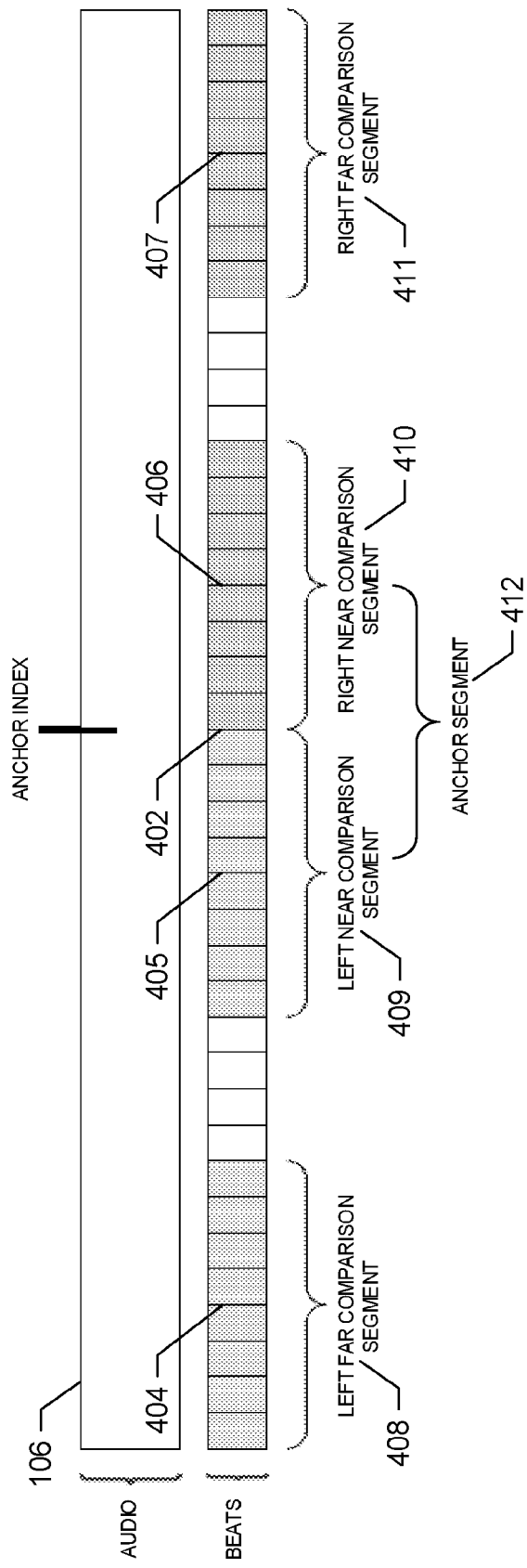
FIG. 4 is a diagram of example training data segment positioning and selection.

FIG. 3 is a block diagram of an example training data generator 300 that may be used to implement the example training data generator 102 of FIG. 1. To select a portion of the incoming digital audio 106 (FIG. 1) to use for training, the example training data generator 300 includes an example index selector 302. The example index selector 302 of FIG. 3 selects an anchor index beat 402 (FIG. 4) in the incoming digital audio 106 using, for example, a random number generator, fixed spacing, etc. The example index selector 302 selects beats 404, 405, 406 and 407 for centers of respective segments 408, 409, 410 and 411 based on the randomly selected anchor index beat 402. In some examples, the beats 404-407 have a fixed arrangement. For example, the segments 409 and 410 are each spaced four beats apart from the anchor index beat 402, and the segments 408 and 411 are each spaced sixteen beats apart from the anchor index beat 402 leaving twelve beats between pair 408 and 409, pair 410 and 411. Additionally, and/or alternatively, the beats 404-407 are selected at a random distance from the anchor index beat 402 on each side. In the illustrated example, the example segments 408-411 include eight beats, however, segments of other size may be used. In some examples, the near examples 409 and 410 are placed four beats apart from the anchor index beat, whilst the far examples 408 and 411 are placed twenty beats apart from the anchor.

To extract the example segments 408-411, the example training data generator 300 includes segment extractors 304, 305, 306, 307 for respective ones of the segments 408-411. The segment extractors 304-307 extract and combine (e.g., concatenate) the matrices of the time-frequency data 118 for the beats of their respective segment 408-411.

To analyze the character of musical sound and/or voice in the segments 408-411, the example training data generator 300 includes timbre modulation analyzers 312, 313, 314, 315 for respective ones of the segments 408-411. The timbre modulation analyzers 312-315 compute, for their respective segment 408-411, a first one-dimensional Fourier Transform of the columns of the concatenated matrices of the time-frequency data 118 forming an intermediate resultant matrix. The timbre modulation analyzers 312-315 then compute a magnitude of the intermediate resultant matrices. The timbre modulation analyzers 312-315 compute a second one-dimensional Fourier Transform along the rows of the intermediate resultant matrices forming respective flattened resultant matrices 316, 317, 318, 319. The timbre modulation analyzers 312-315 compute a magnitude of the resultant matrices. In some examples a log-magnitude may be computed instead of a magnitude before, between and/or after the Fourier transforms. In some examples, a two-dimensional Fourier Transform rather than two one-dimensional Fourier Transforms are computed. While the illustrated example has multiple timbre modulation analyzers 312-315, in other examples, a single timbre modulation analyzer analyzes the segments 408-411 in turn.

To compare segments, the example training data generator 300 includes differencers 320 and 322. The example differencer 320 computes a Euclidean distance or a Cosine distance 324 between the flattened resultant matrix 316 (left far segment 408, see FIG. 4) and the flattened resultant matrix 317 (left near segment 409), and the differencer 322 computes a Euclidean distance 326 between the flattened resultant matrix 318 (right near segment 410) and the flattened resultant matrix 319 (right far segment 411). In some examples the Euclidean distances 324, 326 are computed by computing a difference between a pair of resultant matrices (e.g., resultant matrices 316 and 317, or resultant matrices 318 and 319), and computing a sum of the squares of all difference values. The smaller the Euclidean distance 324, 326, the more the two corresponding segments (408 and 409, or 410 and 411, respectively) on that side of the anchor index beat 402 resemble each other. The side (right or left) of the anchor index beat 402 having the smaller Euclidean distance 324, 326 will be used to select a positive (i.e., similar) training example for the neural network 104, while the opposite side will be used to select a negative (i.e., dissimilar) training example. A comparator 328 identifies the side with the smaller Euclidean distance 324, 326 by comparing the Euclidean distances 324, 326. In some examples, the comparator 328 employs a threshold above which a side cannot be selected for a positive example, but the most distant of comparisons below this threshold will be selected as the side for a positive example. This may increase the frequency at which more distant (for example, in Euclidean timbre modulation distance) may be selected as training examples, up until this threshold.

To select a portion of the incoming digital audio 106 (FIG. 1) to use for positive and negative training examples, the example training data generator 300 includes an example negative index selector 330 and a positive index selector 332. The example comparator 328 provides indicators 334, 336 to respective ones of the selectors 330, 332 indicating on which side (e.g., right or left) the selector 330, 332 is to place its respective segment. In some examples, the selectors 330, 332 select a random location 338, 340 (e.g., at least one beat and no more than sixteen beats away from the anchor index beat 402 for positive examples, at least one beats and no more than ninety-six beats away from the anchor index beat 402 for negative examples) for its respective training segment 342, 344. Additionally, and/or alternatively, the segments are located in a fixed arrangement where their distance from the anchor example is constant.

To extract the example negative training segment 342, the example positive training segment 344, and the example anchor training segment 412, the example training data generator 300 includes segment extractors 348, 350, 352 for respective ones of the segments 342, 344 and a segment 412. The segment extractors 348 and 350 extract and combine (e.g., concatenate) the matrices of the time-frequency data 118 for the beats (e.g., four beats in length) of their respective segment to form respective training segments 342 and 344. The example anchor segment extractor 352 extracts the anchor training segment 412 (see FIG. 4) of, for example, four beats in length, centered on the anchor index beat 402. While the illustrated example has multiple segment extractors 304-307, 348, 350 and 352, in other examples, fewer (e.g., one) segment extractors extract the segments 342, 344, 408-412 in turn.

The training data generator 300 generates multiple triplet examples to form a batch to train the neural network 104 via an optimization algorithm, e.g., via stochastic gradient descent or the Adam adaptive moment optimization algorithm. In some examples the training data generator 300 will take examples from multiple songs or audio streams to form one batch. Additionally, and/or alternatively, it will take multiple examples from each of a set of individual songs or audio streams, where this set may consist of one or more elements.

While an example manner of implementing the training data generator 102 of FIG. 1 is illustrated in FIG. 3, one or more of the elements, processes and/or devices illustrated in FIG. 3 may be combined, divided, re-arranged, omitted, eliminated and/or implemented in any other way. Further, the example index selectors 302, 330, 332, the example segment extractors 304-307, 348, 350, 352, the example timbre modulation analyzers 312-315, the example differencers 320, 322, the example comparator 328 and/or, more generally, the example training data generator 300 of FIG. 3 may be implemented by hardware, software, firmware and/or any combination of hardware, software and/or firmware. Thus, for example, any of the example index selectors 302, 330, 332, the example segment extractors 304-307, 348, 350, 352, the example timbre modulation analyzers 312-315, the example differencers 320, 322, the example comparator 328 and/or, more generally, the example training data generator 300 of FIG. 3 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example index selectors 302, 330, 332, the example segment extractors 304-307, 348, 350, 352, the example timbre modulation analyzers 312-315, the example differencers 320, 322, the example comparator 328 and/or the example training data generator 300 is/are hereby expressly defined to include a non-transitory computer-readable storage device or storage disk such as a memory, a DVD, a CD, a Blu-ray disk, etc. including the software and/or firmware. Further still, the example training data generator 300 of FIG. 3 may include one or more elements, processes and/or devices in addition to, or instead of, those illustrated in FIG. 4, and/or may include more than one of any or all of the illustrated elements, processes and devices.

Figure 5:
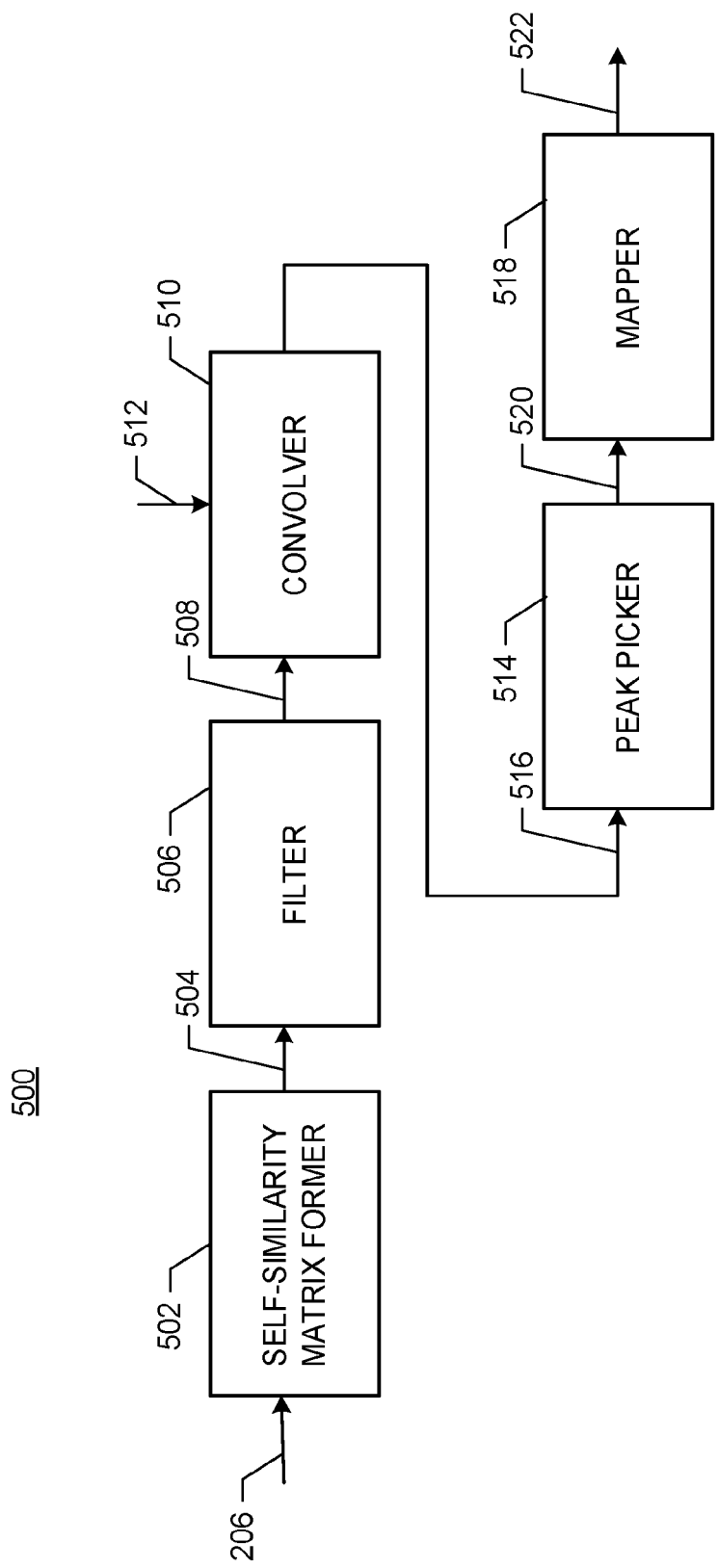
FIG. 5 is a block diagram illustrating an example implementation of the example similarity processor of FIG. 1.
Figure 6:
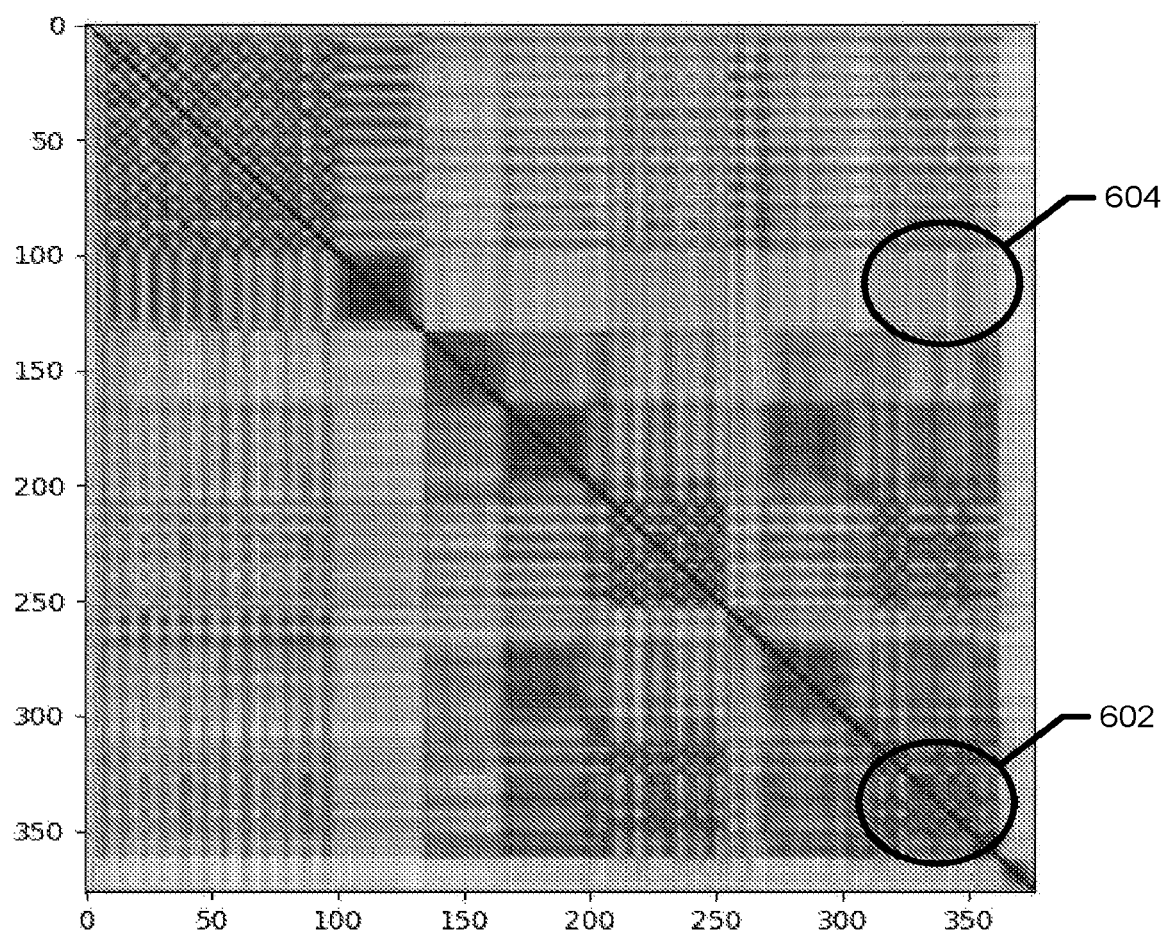
FIG. 6 is a plot of an example similarity matrix.

FIG. 5 is a block diagram of an example similarity processor 500 that may be used to implement the example similarity processor 212 of FIG. 2. To compare portions of audio to other portions of the audio, the example similarity processor 500 includes a self-similarity matrix former 502. The self-similarity matrix former 502 computes a distance (e.g., cosine distance, a Euclidean distance, etc.) between columns of the feature matrices 206 (e.g., sets of deep features 124) associated with two segments (e.g., each including four beats) to form a self-similarity matrix 504. The self-similarity matrix former 502 computes a distance for all pairs of segments, and stores the distances in the self-similarity matrix 504. If the incoming digital audio 106 includes three hundred beats, then the self-similarity matrix 504 will have three hundred by three hundred entries. The self-similarity matrix 504 is a square, symmetric matrix. An example self-similarity matrix 600 for the song "Birthday" by The Beatles is shown in FIG. 6. In FIG. 6, darker areas (e.g., an area 602) correspond to portions of the song with more similarity, and lighter areas (e.g., an area 604) correspond to portions of the song with less similarity. For example, because the area 602 is more musically similar to several other parts of the song it may be a chorus or refrain, however, because the beats around area 604 is less musically similar to most other parts of the song, it may be considered a bridge, solo, etc.

Figure 7:
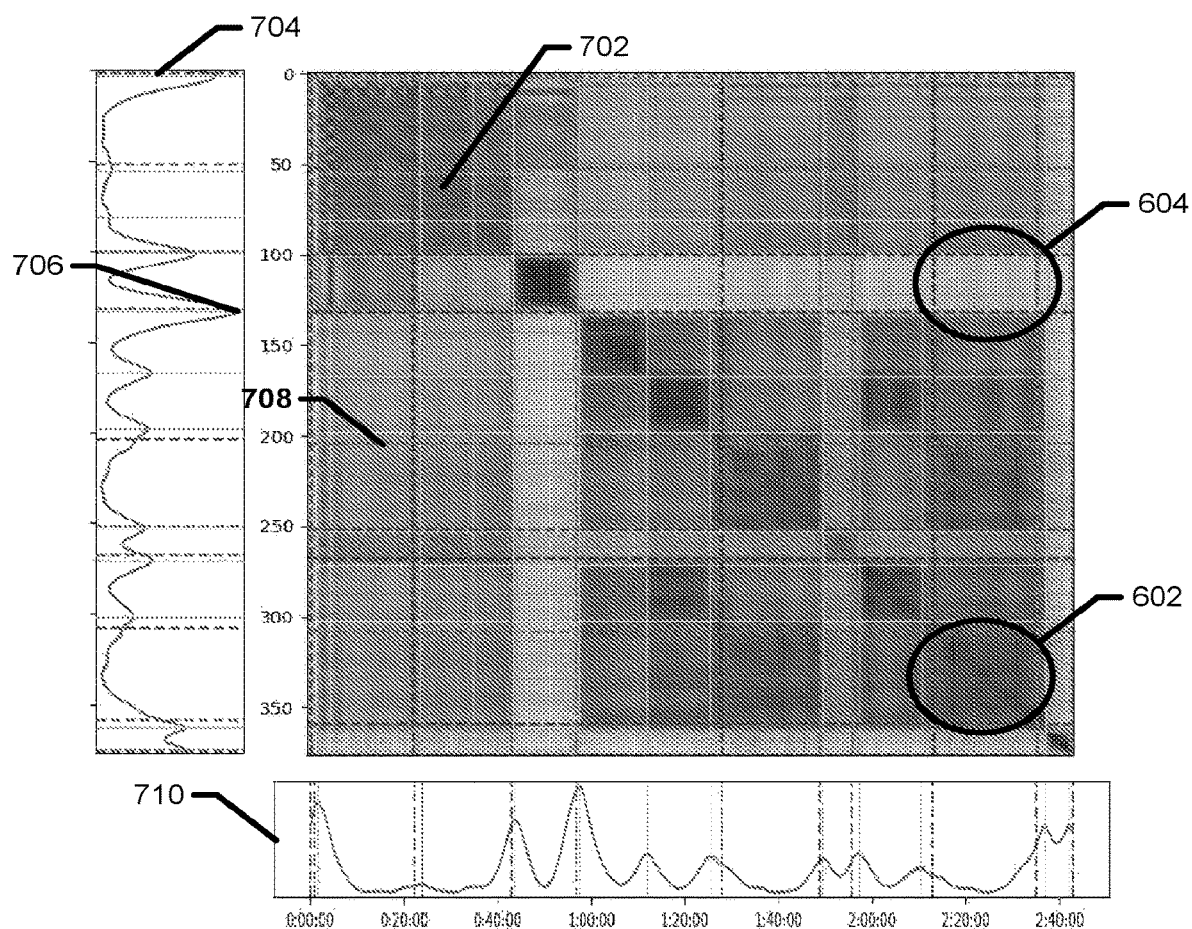
FIG. 7 is a plot of an example median-filtered similarity matrix.

To reduce noise, the example similarity processor 500 includes an example filter 506. In some examples, the example filter 506 of FIG. 5 filters the self-similarity matrix 504 with a median filter that replaces values in the self-similarity matrix 504 with a median of its neighbors (e.g., an eight by eight block of neighbors) to form a median-filtered self-similarity matrix 508. An example median-filtered self-similarity matrix 700 corresponding to the self-similarity matrix 600 of FIG. 6 is shown in FIG. 7

To compute audio segment boundaries, the example similarity processor 500 includes an example convolver 510. The example convolver 510 of FIG. 5 convolves along the main diagonal of the median-filtered self-similarity matrix 508 with a checkerboard kernel 512. The checkerboard kernel 512 is constructed as an elementwise multiplication of two matrices. The first matrix is constructed with four quadrants, each with a constant value that alternates between −1 and 1 between the quadrants. The second matrix is constructed from a two dimensional circularly-symmetric Gaussian function with a selected variance (e.g., a variance of 19.5 indices is preferred). In some examples, the circularly-symmetric Gaussian function is multiplied elementwise by a checkerboard change kernel.

Figure 8:
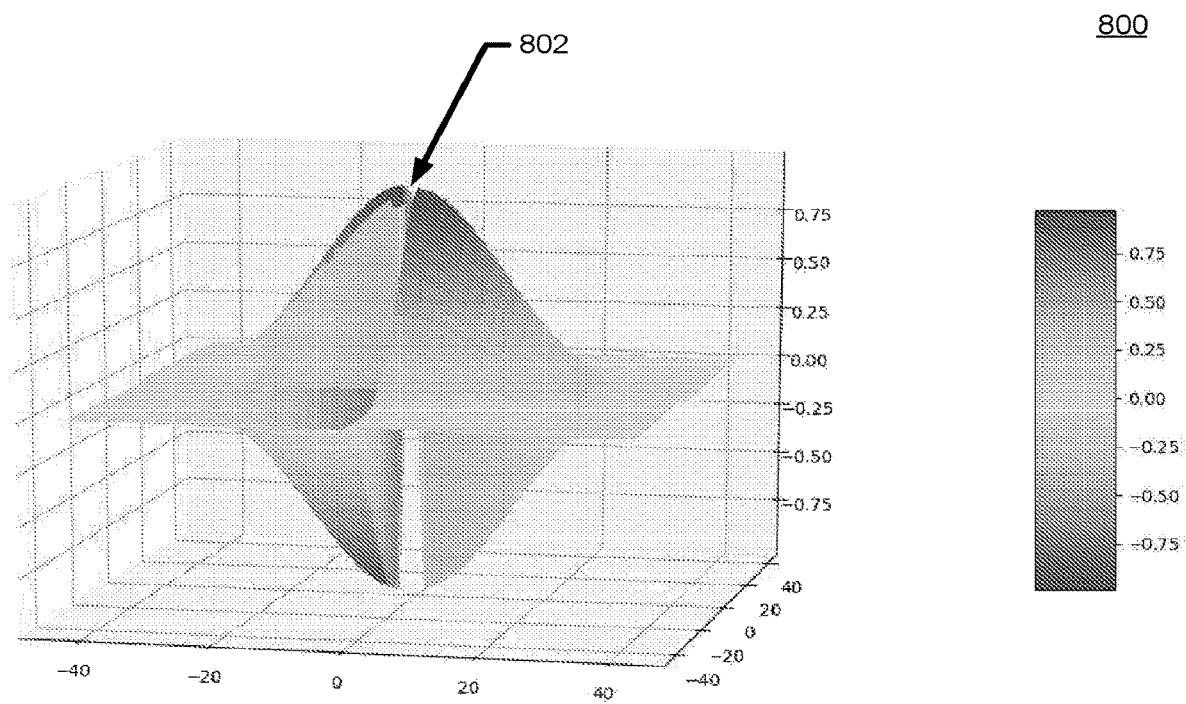
FIG. 8 is a plot of an example checkerboard kernel.

A three-dimensional plot of an example checkerboard kernel 800 is shown in FIG. 8. In FIG. 8, the x-axis and the y-axis refer to a particular coefficient, and the z-axis gives the value of the coefficient. In some examples, only the former quadrant matrix is used directly. However, in some examples, such as that the example graph 800 shown in FIG. 8, there is a gap 802 between the highest points of the kernel in each of the four quadrants, which is shown in FIG. 8 by the quadrants not being directly adjacent, but separated by the gap of a number of rows and/or columns of zeros between each of the quadrants in the former quadrant matrix, e.g., two rows and two columns of zeros between each quadrant is shown. Convolving with the checkerboard kernel 512 along the diagonal produces a one dimensional novelty function vector which may in turn be used to identify audio segment boundaries.

In some examples, instead of a checkerboard kernel convolved along the diagonal, the novelty function may be computed using a differencer to compute absolute differences between rows (e.g., consecutive entire rows) of the similarity matrix 700. In this scenario, the similarity matrix columns may each be smoothed by convolving it with a function (e.g., a Gaussian function) prior to this distance computation. In some examples, instead of consecutive rows, rows at a constant distance from each other may be used, for example, at a distance of two beats apart.

To identify audio segment boundaries, the example similarity processor 500 includes an example peak picker 514. The example peak picker 514 of FIG. 5 identifies peaks in the convolved self-similarity matrix 516 output by the convolver 510. For example, in FIG. 7 an example convolved self-similarity matrix 516 along the main diagonal 702 of the matrix 700 is shown in the plot 704. Peaks (e.g., a peak 706) in the plot 704 correspond to audio segment boundaries identified by the similarity processor 500 in the incoming digital audio 106. Dashed lines (e.g., a line 708)

represent audio segment boundaries identified manually by a human listener. As shown, the audio segment boundaries identified by the similarity processor 500 correlate well with the human listener.

In some examples, the example peak picker 514 chooses peaks based on thresholding a peak metric at all points in the novelty function 514 where the gradient changes from positive to negative. An example of such a peak metric may be a crest factor, which can be expressed mathematically as:

$$\text{metric} = \frac{n_p}{\sqrt{\sum_{i=p-w/2}^{p+w/2} \|n_i\|^2}}, \quad \text{EQN (3)}$$

where $n_j$ refers to the novelty function 514 at index j, p refers to the index of a detected peak and/or change in gradient, and w refers to a window length for computing the peak metric. An example threshold for such a metric is 1.35 with a window length of 20 beats. In some examples, if a change from a positive gradient to a negative gradient does not exceed the peak threshold based on the above metric, a left side and right side metric may, additionally and/or alternatively, be computed. This is equivalent to the metric shown in EQN (3) where the summation limits are replaced with the limits i=p−w to i=p and the limits i=p to i=p+w, for left and right side peak metrics respectively. In some examples, if there are multiple peaks within a short time window (e.g., 8 or 16 beats), then only the peak with the highest novelty value is selected.

To map audio segment boundaries to time, the example similarity processor 500 includes an example mapper 518. The example mapper 518 maps the audio segment boundaries expressed in beats 520 to audio segment boundaries expressed in time 522.

While an example manner of implementing the similarity processor 212 of FIG. 2 is illustrated in FIG. 5, one or more of the elements, processes and/or devices illustrated in FIG. 5 may be combined, divided, re-arranged, omitted, eliminated and/or implemented in any other way. Further, the example self-similarity matrix former 502, the example filter 506, the example convolver 510, the example peak picker 514, the example mapper 518 and/or, more generally, the example similarity processor 500 of FIG. 5 may be implemented by hardware, software, firmware and/or any combination of hardware, software and/or firmware. Thus, for example, any of the example self-similarity matrix former 502, the example filter 506, the example convolver 510, the example peak picker 514, the example mapper 518 and/or, more generally, the example similarity processor 500 of FIG. 5 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example self-similarity matrix former 502, the example filter 506, the example convolver 510, the example peak picker 514, the example mapper 518 and/or the example similarity processor 500 is/are hereby expressly defined to include a non-transitory computer-readable storage device or storage disk such as a memory, a DVD, a CD, a Blu-ray disk, etc. including the software and/or firmware. Further still, the example similarity processor 500 of FIG. 5 may include one or more elements, processes and/or devices in addition to, or instead of, those illustrated in FIG. 5, and/or may include more than one of any or all of the illustrated elements, processes and devices.

Figure 10:
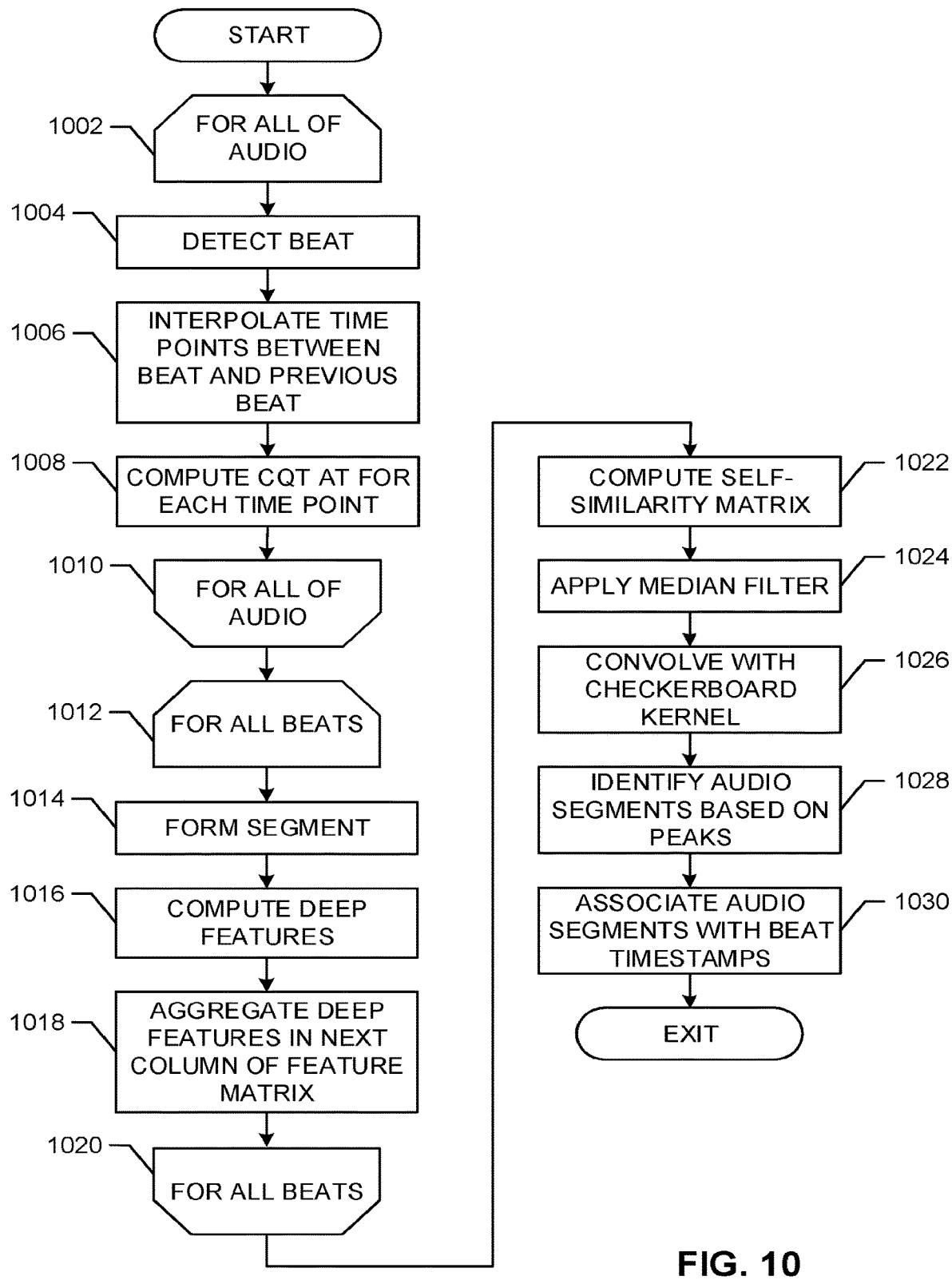
FIG. 10 is a flowchart representative of example hardware logic or machine-readable instructions for implementing the example similarity analysis system of FIG. 2.

A flowchart representative of example hardware logic, machine-readable instructions, hardware implemented state machines, and/or any combination thereof for implementing the example similarity system 200 FIG. 2 is shown in FIG. 10. The machine-readable instructions may be an executable program or portion of an executable program for execution by a computer processor such as the processor 1110 shown in the example processor platform 1100 discussed below in connection with FIG. 11. The program may be embodied in software stored on a non-transitory computer-readable storage medium such as a compact disc read-only memory (CD-ROM), a floppy disk, a hard drive, a DVD, a Blu-ray disk, or a memory associated with the processor 1110, but the entire program and/or parts thereof could alternatively be executed by a device other than the processor 1110 and/or embodied in firmware or dedicated hardware. Further, although the example program is described with reference to the flowchart illustrated in FIG. 10, many other methods of implementing the example similarity analysis system 200 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 10 may be implemented using executable instructions (e.g., computer and/or machine-readable instructions) stored on a non-transitory computer and/or machine-readable medium such as a hard disk drive, a flash memory, a read-only memory, a CD-ROM, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The program of FIG. 10 begins at block 1002, where, for all incoming digital audio 106 of, for example, a song, a next beat is detected (block 1004), and a fixed number of time points (e.g., one hundred twenty-eight) are interpolated between the beat and the previous beat between beats (block 1006). A CQT of the time points 114 for each time point 114 is computed (block 1008) and combined to form matrices of time-frequency data 118.

When all the incoming digital audio have been processed (block 1010), for all beats, the time-frequency data 118 for a beat is combined with the time-frequency data 118 of other beats to form the segments 202 (block 1014). For example, the matrix of time-frequency data 118 associated with an older beat is dropped, and the matrix of time-frequency data 118 associated with a newer beat is added. The segment 202 is provided to a neural network 104 to compute a set of deep features 124 for the beat (block 1016) by passing the segment 202 through the neural network 104. The deep features 124 are placed in the column of the feature matrix 206 corresponding to the beat (block 1018) by the aggregator 208.

When all beats of the incoming digital audio have been processed (block 1020), the self-similarity matrix former 502 forms a self-similarity matrix 504 from the feature matrix 206 (block 1022). For example, the self-similarity matrix former 502 computes a distance (e.g., a cosine distance, a Euclidean distance, etc.) between sets of deep features 124 (e.g., columns of the feature matrix 206) associated with two beats to form a self-similarity matrix 504. A median filter 506 is applied (block 1024). A convolver 510 convolves the median-filtered self-similarity matrix 508 with a checkerboard kernel 512 (block 1026). A peak picker 514 identifies and picks audio segments of the incoming digital audio 106 based on peaks of the convolved self-similarity matrix 516 (block 1028). The mapper 518 associates the audio segments of the incoming digital audio 106 with timestamps (block 1030). Control then exits from the example process of FIG. 10.

Figure 11:
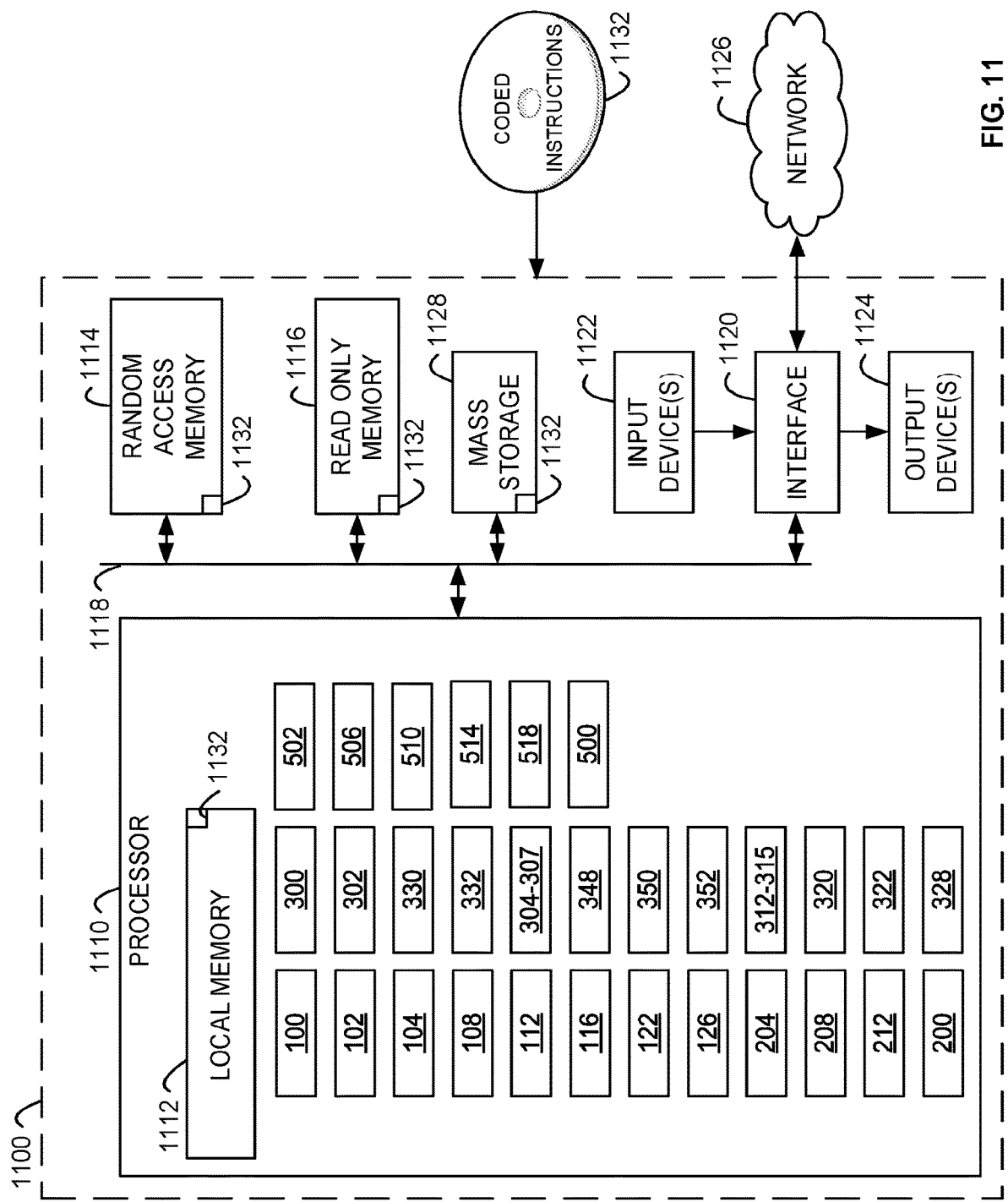
FIG. 11 illustrates an example processor platform structured to execute the example machine-readable instructions of FIG. 10 to implement the example similarity analysis system of FIG. 2.

FIG. 11 is a block diagram of an example processor platform 1100 structured to execute the instructions of FIG. 10 to implement the training system 100, the similarity analysis system 200, the training data generator 300, and the similarity processor 500 of FIGS. 1-3 and 5. The processor platform 1100 can be, for example, a server, a personal computer, a workstation, a self-learning machine (e.g., a neural network), a mobile device (e.g., a cell phone, a smart phone, a tablet such as an IPAD™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1110. The processor 1110 of the illustrated example is hardware. For example, the processor 1110 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example training data generator 102, the example neural network 104, the example beat detector 108, the example interpolator 112, the example frequency analyzer 116, the example deep feature generator 122, the example distance calculator 126, the example training system 100, the example segment extractor 204, the aggregator 208, the example similarity processor 212, the example similarity analysis system 200, the example index selectors 302, 330, 332, the example segment extractors 304-307, 348, 350, 352, the example timbre modulation analyzers 312-315, the example differencers 320, 322, the example comparator 328, the example training data generator 300, the example self-similarity matrix former 502, the example filter 506, the example convolver 510, the example peak picker 514, the example mapper 518, and the example similarity processor 500 of FIG. 5.

The processor 1110 of the illustrated example includes a local memory 1112 (e.g., a cache). The processor 1110 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller. The memory may be used to store, among other things, the audio incoming digital audio 106, the beat markers 110, the time points 114, the time-frequency data 118, the segments 202, 408-411, 342, 344, 412, the deep features 124, the internal coefficients 128, the feature matrix 206, the self-similarity matrix 504, the median-filtered self-similarity matrix 508, and the convolved self-similarity matrix 516.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1110. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc. In some examples of a Wi-Fi system, the interface circuit 1120 includes a radio frequency (RF) module, antenna(s), amplifiers, filters, modulators, etc.

The processor platform 1100 of the illustrated example also includes one or more mass storage devices 1128 for storing software and/or data. Examples of such mass storage devices 1128 include floppy disk drives, hard drive disks, CD drives, Blu-ray disk drives, redundant array of independent disks (RAID) systems, and DVD drives.

Coded instructions 1132 including the coded instructions of FIG. 10 may be stored in the mass storage device 1128, in the volatile memory 1114, in the non-volatile memory 1116, and/or on a removable non-transitory computer-readable storage medium such as a CD-ROM or a DVD.

From the foregoing, it will be appreciated that example methods, apparatus and articles of manufacture have been disclosed that determine audio segment similarities. From the foregoing, it will be appreciated that methods, apparatus and articles of manufacture have been disclosed which enhance the operations of a computer to determine audio segments and audio segment similarities. That is, through the use of these processes, computers can operate more efficiently by relatively quickly performing automated audio segmentation and computing audio segment similarities. The disclosed methods, apparatus and articles of manufacture are accordingly directed to one or more improvement(s) in the functioning of a computer.

Example methods, apparatus, and articles of manufacture to segment audio and determine audio segment similarities are disclosed herein. Further examples and combinations thereof include at least the following.

Example 1 is a method that includes developing features characterizing audio with a neural network, computing a self-similarity matrix based on the features, and identifying segments of the audio based on the self-similarity matrix.

Example 2 is the method of example 1, wherein identifying the segments includes filtering with a median filter.

Example 3 is the method of example 1, wherein identifying the segments includes convolving with a checkerboard kernel, wherein the checkerboard kernel represents a two-dimensional circularly-symmetric Gaussian function multiplied elementwise by a checkerboard change kernel.

Example 4 is the method of example 1, wherein identifying the segments includes:
  filtering the self-similarity matrix with a median filter to form a median-filtered self-similarity matrix;
  convolving columns of the median-filtered self-similarity matrix with a smoothing function to form a smoothed matrix;
  computing absolute differences between rows of the smoothed matrix to form a novelty function vector; and
  identifying the segments based on peaks of the novelty function vector.

Example 5 is the method of example 1, wherein identifying the segments includes filtering the self-similarity matrix with a median filter to form a median-filtered self-similarity matrix, convolving the median-filtered self-similarity matrix with a checkerboard kernel to form a novelty function vector, and identifying the segments based on peaks of the novelty function vector.

Example 6 is the method of example 1, wherein developing the features includes computing first time-frequency data for a first plurality of samples of the audio for a first plurality of time points between a first pair of beats, and inputting the first time-frequency data into the neural network to develop the features, wherein the features include deep features of the neural network.

Example 7 is the method of example 6, further including detecting the first pair of beats in the audio.

Example 8 is the method of example 6, further including computing second time-frequency data for a second plurality of samples of the audio for a second plurality of time points between a second pair of beats; and inputting the first time-frequency data together with the second time-frequency data into the neural network to develop the features.

Example 9 is an apparatus comprising a neural network to develop features characterizing audio, a matrix former to form a self-similarity matrix based on the features, and a peak picker to identify segments of the audio based on the self-similarity matrix.

Example 10 is the apparatus of example 9, further including a mean filter to filter the self-similarity matrix at least one of a checkerboard kernel, or a smoothing function to form a mean filtered matrix.

Example 11 is the apparatus of example 10, further including a convolver to convolve the mean filtered matrix with a checkerboard kernel.

Example 12 is the apparatus of example 9, further including:
  a filter to filter the self-similarity matrix with a median filter to form a median-filtered self-similarity matrix;
  a convolver to convolve columns of the median-filtered self-similarity matrix with a smoothing function to form a smoothed matrix;
  a differencer to compute absolute differences between rows of the smoothed matrix to form a novelty function vector; and
  peak predictor to identify the segments based on peaks of the novelty function vector.

Example 13 is the apparatus of example 9, further including a mean filter to filter the self-similarity matrix to form a mean filtered matrix, a convolver to convolve the mean filtered matrix with a checkerboard kernel to form a novelty function vector, and a peak predictor to identify the segments based on peaks of the novelty function vector.

Example 14 is the apparatus of example 9, further including a frequency analyzer to develop first time-frequency data for a first plurality of samples of the audio for a first plurality of time points between a first pair of beats, wherein the neural network is to develop the features based on the first time-frequency data, wherein the features include deep features of the neural network.

Example 15 is the apparatus of example 14, further including a beat detector to detecting the first pair of beats in the audio.

Example 16 is the apparatus of example 14, wherein the frequency analyzer is to develop second time-frequency data for a second plurality of samples of the audio for a second plurality of time points between a second pair of beats, wherein the neural network is to develop the second features based on the second time-frequency data Example 17 is a non-transitory computer-readable storage medium comprising a set of instructions that, when executed, cause a processor to at least develop features characterizing audio with a neural network, compute a self-similarity matrix based on the features, and identify segments of the audio based on the self-similarity matrix.

Example 18 is the non-transitory computer-readable storage medium of example 17, wherein the set of instructions, when executed, cause the processor to identify the segments includes filtering with a median filter.

Example 19 is the non-transitory computer-readable storage medium of example 17, wherein the set of instructions, when executed, cause the processor to identify the segments includes convolving with at least one of a checkerboard kernel, or a smoothing function.

Example 20 is the non-transitory computer-readable storage medium of example 17, wherein the set of instructions, when executed, cause the processor to:

filter the self-similarity matrix with a median filter to form a median-filtered self-similarity matrix;

convolve columns of the median-filtered self-similarity matrix with a smoothing function to form a smoothed matrix;

compute absolute differences between rows of the smoothed matrix to form a novelty function vector; and identify the segments based on peaks of the novelty function vector.

Example 21 is the non-transitory computer-readable storage medium of example 17, wherein the set of instructions, when executed, cause the processor to identify the segments by filtering the self-similarity matrix with a median filter to form a median-filtered self-similarity matrix, convolving the median-filtered self-similarity matrix with a checkerboard kernel to form a novelty function vector, and identifying the segments based on peaks of the novelty function vector.

Example 22 is the non-transitory computer-readable storage medium of example 17, wherein the set of instructions, when executed, cause the processor to develop the features by computing first time-frequency data for a first plurality of samples of the audio for a first plurality of time points between a first pair of beats, and inputting the first time-frequency data into the neural network to develop the features, wherein the features include deep features of the neural network.

Example 23 is the non-transitory computer-readable storage medium of example 22, wherein the set of instructions, when executed, cause the processor to detect the first pair of beats in the audio.

Example 24 is the non-transitory computer-readable storage medium of example 22, wherein the set of instructions, when executed, cause the processor to compute second time-frequency data for a second plurality of samples of the audio for a second plurality of time points between a second pair of beats, and input the first time-frequency data together with the second time-frequency data into the neural network to develop the features.

Example 25 is a method including determining a first difference between two first segments on a first side of an anchor index beat in audio, determining a second difference between two second segments on a second side of the anchor index beat in the audio, and training a neural network using at least one of a triplet or a contrastive loss, wherein a positive training segment is extracted from the first side or the second side based on a comparison of the first difference and the second difference, wherein a negative training segment is extracted from the other of the first side or the second side, and wherein an anchor training segment is extracted from about the anchor index beat.

Example 26 is the method of example 25, further including computing time-frequency data for a first plurality of samples of the audio for a plurality of time points between a pair of beats, and computing at least one of a two-dimensional Fourier Transform of the time-frequency data, or two one-dimensional Fourier Transforms of the time-frequency data.

Example 27 is the method of example 25, wherein determining the first difference between two first segments includes computing at least one of a Euclidean distance or a cosine distance between the two first segments.

Example 28 is the method of example 25, further including, detecting two beats in the audio, and determining the two first segments based on the two beats.

Example 29 is the method of example 25, further including randomly selecting the anchor index beat.

Example 30 is a non-transitory computer-readable storage medium comprising a set of instructions that, when executed, cause a processor to at least determine a first difference between two first segments on a first side of an anchor index beat in audio, determine a second difference between two second segments on a second side of the anchor index beat in the audio, and train a neural network using at least one of a triplet or a contrastive loss, wherein a positive training segment is extracted from the first side or the second side based on a comparison of the first difference and the second difference, wherein a negative training segment is extracted from the other of the first side or the second side, and wherein an anchor training segment is extracted from about the anchor index beat.

Example 31 is the non-transitory computer-readable storage medium of example 30, wherein the set of instructions, when executed, cause the processor to compute time-frequency data for a first plurality of samples of the audio for a plurality of time points between a pair of beats, and compute at least one of a two-dimensional Fourier Transform of the time-frequency data, or two one-dimensional Fourier Transforms of the time-frequency data.

Example 32 is the non-transitory computer-readable storage medium of example 30, wherein the set of instructions, when executed, cause the processor to determine the first difference between two first segments by computing at least one of a Euclidean distance or a cosine distance between the two first segments.

Example 33 is the non-transitory computer-readable storage medium of example 30, wherein the set of instructions, when executed, cause the processor to detect two beats in the audio, and determine the two first segments based on the two beats.

Example 34 is the non-transitory computer-readable storage medium of example 30, wherein the set of instructions, when executed, cause the processor to randomly select the anchor index beat.

Any references, including publications, patent applications, and patents cited herein are hereby incorporated in their entirety by reference to the same extent as if the references were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory computer readable storage medium comprising instructions that, when executed, cause one or more processors to at least:

train a neural network to:
select an anchor index beat of digital audio;
analyze a first segment of the digital audio based on the selected anchor index beat, wherein the first segment comprises at least two beats and a respective center beat; and
based on analyzing the first segment, generate a first deep feature, wherein the first deep feature indicates a characteristic of the first segment of the digital audio; and execute the neural network to determine audio similarities between a second segment of audio and the first segment of the digital audio based on the generated first deep feature.

2. The non-transitory computer readable storage medium of claim 1, wherein selecting the anchor index beat of digital audio comprises using a random number generator.

3. The non-transitory computer readable storage medium of claim 1, wherein selecting the anchor index beat of digital audio comprises using fixed spacing.

4. The non-transitory computer readable storage medium of claim 1, wherein the characteristic of the first segment of the digital audio comprises a class of the first segment of the digital audio.

5. The non-transitory computer readable storage medium of claim 1, wherein the characteristic of the first segment of the digital audio comprises a descriptor of the first segment of the digital audio.

6. The non-transitory computer readable storage medium of claim 1, wherein the characteristic of the first segment of the digital audio comprises one or more of the following: (i) pitch; (ii) melodies; (iii) chords; (iv) rhythms; (v) timbre modulation; (vi) instruments; (vii) vocalists; and (viii) dynamics.

7. The non-transitory computer readable storage medium of claim 1, wherein the characteristic of the first segment of the digital audio comprises one or more of the following: (i) production methods; (ii) filtering effect; (iii) compression effect; and (iv) panning effect.

8. The non-transitory computer readable storage medium of claim 1, wherein instructions, when executed, further cause one or more processors to at least:
   analyze the second segment of the digital audio based on the selected anchor index beat, wherein the second segment comprises at least two beats and a respective center beat; and
   based on analyzing the second segment, generate a second deep feature, wherein the second deep feature indicates a characteristic of the second segment of the digital audio.

9. The non-transitory computer readable storage medium of claim 8, wherein determining audio similarities between the second segment of audio and the first segment of the digital audio is based on comparing the generated second deep feature to the generated first deep feature.

10. The non-transitory computer readable storage medium of claim 9, wherein comparing the generated second deep feature to the generated first deep feature comprises training internal coefficients to classify the generated first deep feature as similar to the generated second deep feature based on a descriptor of the first deep feature and a descriptor of a second deep feature.

11. A method comprising:
   training a neural network to:
      select an anchor index beat of digital audio;
      analyze a first segment of the digital audio based on the selected anchor index beat, wherein the first segment comprises at least two beats and a respective center beat; and
      based on analyzing the first segment, generate a first deep feature, wherein the first deep feature indicates a characteristic of the first segment of the digital audio; and
   executing the neural network to determine audio similarities between a second segment of audio and the first segment of the digital audio based on the generated first deep feature.

12. The method of claim 11, wherein selecting the anchor index beat of digital audio comprises using a random number generator.

13. The method of claim 11, wherein selecting the anchor index beat of digital audio comprises using fixed spacing.

14. The method of claim 11, wherein the characteristic of the first segment of the digital audio comprises a class of the first segment of the digital audio.

15. The method of claim 11, wherein the characteristic of the first segment of the digital audio comprises a descriptor of the first segment of the digital audio.

16. The method of claim 11, wherein the characteristic of the first segment of the digital audio comprises one or more of the following: (i) pitch; (ii) melodies; (iii) chords; (iv) rhythms; (v) timbre modulation; (vi) instruments; (vii) vocalists; and (viii) dynamics.

17. The method of claim 11, wherein the characteristic of the first segment of the digital audio comprises one or more of the following: (i) production methods; (ii) filtering effect; (iii) compression effect; and (iv) panning effect.

18. The method of claim 11, wherein the method further comprises training the neural network to:
   analyze the second segment of the digital audio based on the selected anchor index beat, wherein the second segment comprises at least two beats and a respective center beat; and
   based on analyzing the second segment, generate a second deep feature, wherein the second deep feature indicates a characteristic of the second segment of the digital audio.

19. The method of claim 18, wherein determining audio similarities between the second segment of audio and the first segment of the digital audio is based on comparing the generated second deep feature to the generated first deep feature.

20. A device comprising:
   at least one memory storing instructions; and
   at least one processor to execute instructions to at least:
      train a neural network to:
         select an anchor index beat of digital audio;
         analyze a first segment of the digital audio based on the selected anchor index beat, wherein the first segment comprises at least two beats and a respective center beat; and
         based on analyzing the first segment, generate a first deep feature, wherein the first deep feature indicates a characteristic of the first segment of the digital audio; and
      execute the neural network to determine audio similarities between a second segment of audio and the first segment of the digital audio based on the generated first deep feature.

* * * * *